United States Patent
Krebs et al.

(10) Patent No.: US 10,768,900 B2
(45) Date of Patent: Sep. 8, 2020

(54) MODEL-BASED SERVICE REGISTRY FOR SOFTWARE SYSTEMS

(71) Applicant: SAP SE, Walldorf (DE)

(72) Inventors: Rouven Krebs, Römerberg (DE); Steffen Koenig, Heidelberg (DE)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 16/210,060

(22) Filed: Dec. 5, 2018

(65) Prior Publication Data

US 2020/0183652 A1    Jun. 11, 2020

(51) Int. Cl.
| | | |
|---|---|---|
| *G06F 8/70* | (2018.01) | |
| *G06F 9/54* | (2006.01) | |
| *G06F 8/20* | (2018.01) | |
| *G06F 8/35* | (2018.01) | |
| *G06F 16/903* | (2019.01) | |

(52) U.S. Cl.
CPC .............. *G06F 8/20* (2013.01); *G06F 8/35* (2013.01); *G06F 8/70* (2013.01); *G06F 9/541* (2013.01); *G06F 16/903* (2019.01)

(58) Field of Classification Search
USPC ........................................................ 717/120
See application file for complete search history.

(56) References Cited

U.S. PATENT DOCUMENTS

| | | |
|---|---|---|
| 6,775,657 B1 | 8/2004 | Baker |
| 6,827,578 B2 | 12/2004 | Krebs et al. |
| 6,839,850 B1 | 1/2005 | Campbell et al. |
| 7,181,768 B1 | 2/2007 | Ghosh et al. |
| 7,313,618 B2 | 12/2007 | Braemer et al. |
| 7,844,829 B2 | 11/2010 | Meenakshisundaram |
| 8,392,908 B2 | 3/2013 | Laicher et al. |
| 8,539,445 B2 * | 9/2013 | Gangemi ............... G06F 8/60 717/120 |
| 8,644,755 B2 | 2/2014 | Krebs et al. |
| 8,671,392 B2 | 3/2014 | Jahr et al. |
| 9,026,502 B2 | 5/2015 | Driesen et al. |
| 9,183,123 B2 | 11/2015 | Spektor et al. |
| 9,189,226 B2 | 11/2015 | Driesen et al. |
| 9,195,453 B1 | 11/2015 | Giammaria et al. |
| 9,276,825 B2 | 3/2016 | Misovski et al. |
| 9,336,060 B2 | 5/2016 | Nori et al. |
| 9,489,647 B2 | 11/2016 | Martinez et al. |
| 9,639,448 B2 | 5/2017 | Gebhard et al. |
| 9,678,740 B2 | 6/2017 | Heine et al. |

(Continued)

OTHER PUBLICATIONS

U.S. Appl. No. 15/665,700, filed Aug. 1, 2007, Rouven Krebs.

(Continued)

*Primary Examiner* — Jason D Mitchell
(74) *Attorney, Agent, or Firm* — Fish & Richardson P.C.

(57) ABSTRACT

Methods, systems, and computer-readable storage media for receiving, by an operation controller, a call to trigger an operation, the call at least partially including an identifier associated with an operation signature, providing the operation signature based on the identifier, identifying, by the operation controller, an operation provider that provides the operation corresponding to the operation signature, validating, by the operation provider, one or more conditions for execution of the operation, and executing the operation to affect an entity within a landscape in response to the one or more conditions being valid.

17 Claims, 8 Drawing Sheets

(56) References Cited

U.S. PATENT DOCUMENTS

| | | |
|---|---|---|
| 9,722,890 B2 | 8/2017 | Jahr et al. |
| 2003/0055878 A1* | 3/2003 | Fletcher ................. G06F 9/465 709/203 |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0154176 A1 | 8/2003 | Krebs et al. |
| 2003/0188189 A1 | 10/2003 | Desai et al. |
| 2004/0117658 A1 | 6/2004 | Klaes |
| 2007/0073519 A1 | 3/2007 | Long |
| 2007/0226751 A1* | 9/2007 | Brendle ................. G06F 9/465 719/313 |
| 2009/0055345 A1* | 2/2009 | Mehta ................... G06F 16/907 |
| 2009/0119664 A1* | 5/2009 | Pike .................... G06F 9/45558 718/1 |
| 2009/0248473 A1 | 10/2009 | Doenig et al. |
| 2010/0094886 A1 | 4/2010 | Krebs |
| 2010/0212013 A1 | 8/2010 | Kim et al. |
| 2012/0233593 A1* | 9/2012 | Sahoo ..................... G06F 8/61 717/120 |
| 2013/0024922 A1* | 1/2013 | Rodriguez ............ G06F 9/5072 726/6 |
| 2013/0159427 A1 | 6/2013 | Jahr et al. |
| 2013/0191820 A1 | 7/2013 | Jahr et al. |
| 2014/0059544 A1* | 2/2014 | Koganty ............ G06F 9/45533 718/1 |
| 2014/0379669 A1 | 12/2014 | Driesen et al. |
| 2014/0380265 A1 | 12/2014 | Driesen et al. |
| 2015/0033322 A1 | 1/2015 | Wang et al. |
| 2015/0100684 A1 | 4/2015 | Maes et al. |
| 2015/0237067 A1 | 8/2015 | Talyansky |
| 2015/0295844 A1 | 10/2015 | Perreira et al. |
| 2016/0226992 A1 | 8/2016 | Akcin |
| 2016/0241444 A1 | 8/2016 | Maes |
| 2017/0061348 A1 | 3/2017 | Mack et al. |
| 2017/0109137 A1 | 4/2017 | Subramanian et al. |
| 2017/0109536 A1 | 4/2017 | Stopel et al. |
| 2017/0115976 A1 | 4/2017 | Mills |
| 2017/0169217 A1 | 6/2017 | Rahaman et al. |
| 2017/0329588 A1* | 11/2017 | Lundberg ............ G06F 9/44521 |
| 2018/0062929 A1* | 3/2018 | Maskalik ............ H04L 41/0886 |
| 2019/0108079 A1* | 4/2019 | Lian .................... G06F 9/44505 |

OTHER PUBLICATIONS

U.S. Appl. No. 15/665,758, filed Aug. 1, 2017, Rouven Krebs.
U.S. Appl. No. 15/673,691, filed Aug. 10, 2017, Krebs et al.
U.S. Appl. No. 15/812,248, filed Nov. 14, 2017, Jahr, Andreas.
U.S. Appl. No. 16/011,751, filed Jun. 19, 2018, Hoke et al.

* cited by examiner

MODEL-BASED SERVICE REGISTRY FOR SOFTWARE SYSTEMS

BACKGROUND

Enterprise-level software systems have grown increasingly complex. This includes, for example, increasing application complexity at both the domain level, and the technical level, as well as multiple, combined various runtime environments. Further, multiple, different communication models can be employed. Such complexity makes it difficult to provide all-embracing lifecycle operations for enterprise-level software systems.

SUMMARY

Implementations of the present disclosure are directed to operation of enterprise-level software systems. More particularly, implementations of the present disclosure are directed to a model-based service registry for software systems.

In some implementations, actions include receiving, by an operation controller, a call to trigger an operation, the call at least partially including an identifier associated with an operation signature, providing the operation signature based on the identifier, identifying, by the operation controller, an operation provider that provides the operation corresponding to the operation signature, validating, by the operation provider, one or more conditions for execution of the operation, and executing the operation to affect an entity within a landscape in response to the one or more conditions being valid. Other implementations of this aspect include corresponding systems, apparatus, and computer programs, configured to perform the actions of the methods, encoded on computer storage devices.

These and other implementations can each optionally include one or more of the following features: actions further include receiving, by a landscape service, a query for one or more operations that can be executed to affect the entity within the landscape, and providing, by the landscape service, and in response to the query, a set of operations available for the entity based on a landscape model, the landscape model including a data model representative of the landscape, the set of operations including at least the operation; the landscape service further includes an operations model representing an operations registry including operations available for entities of the landscape; the one or more conditions are based on one or more validations that define a state of one or more entities of the landscape for execution of the operation; actions further include querying, by the operation provider, a landscape model of a landscape service to identify one or more entities of the landscape, for which the operation provider has an available operation, and for at least one available operation, providing a respective operation signature stored within the landscape service; the operation provider is included in a plurality of operation providers registered with the operation controller; and the operation controller monitors execution of the operation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to operation of enterprise-level software systems. More particularly, implementations of the present disclosure are directed to a model-based service registry for software systems. Implementations can include actions of receiving, by an operation controller, a call to trigger an operation, the call at least partially including an identifier associated with an operation signature, providing the operation signature based on the identifier, identifying, by the operation controller, an operation provider that provides the operation corresponding to the operation signature, validating, by the operation provider, one or more conditions for execution of the operation, and executing the operation to affect an entity within a landscape in response to the one or more conditions being valid.

To provide context for implementations of the present disclosure, and as introduced above, enterprise-level software systems have grown increasingly complex. This includes, for example, increasing application complexity at both the domain level, and the technical level (e.g., due to splitting into multiple services), as well as multiple, combined various runtime environments (e.g., container, virtual machine (VM), platform-as-a-service (PaaS)). Further, multiple, different communication models (e.g., message bus, direct calls) can be employed. Such complexity makes it difficult to provide all-embracing lifecycle operations for enterprise-level software systems.

At least a portion of this complexity can be attributed to the increasing use of micro-services. A micro-service can be combined with multiple other services to structure an application in a so-called micro-services architecture. Microservices have become of increasing importance in modern software systems. The packaging of small sets of functionalities into independently deployed and operated micro-services increases reusability, scalability, availability, and the capability to adopt to new requirements. It also decouples development processes. That is, for example, each micro-service can be independently developed.

Service oriented architectures (SOAs) and service-like interaction with existing software system are common place. However, composing services with a fine-grained functionality to higher value services has always been challenging. There are multiple reasons for this difficulty on different abstraction levels. For example, domain-driven issues include incompatibility of data on a sematic level, incompatibility of workflows, and high effort and service-dependent knowledge to combine the services. As another example, technical-based issues include incompatibility of data types on a syntactic level, resolving the destination of a service, and resolving dependencies between services and functionality. Further, the number of services, across which applications are split continuously increases.

In some examples, service registries are used to reduce these issues. However, traditional service registries fail to provide sufficient domain knowledge, and/or semantically strong interface definitions to automatically bind services. Existing solutions provide only human-readable definitions, and sometimes automated syntactical checks for compatibility. In some existing solutions, the service registry is enriched with key value pairs.

Additionally, each service might be operated by an independent team in a development operations (devops) way. However, if services are combined (mashed) there is still a requirement to have centrally controlled lifecycle operations available (e.g., move all instances in case of disaster recovery). These activities should be triggered by a central instance (e.g., a user through a user interface (UI)). There is a significant gap between the independent devops of (micro) services when they are mashed to more complex applications, and the need for an overall operation model. This means that, when it comes to operations in a mashed service architecture, single teams are no longer independent. This becomes even more difficult in environments where traditional systems that do not follow a devops model are involved.

All of this presents multiple technical problems. Example technical problems include, without limitation, high diversity within the application and service mashes (various technologies and environments); fast changing environments (instances are created and deleted in short cycles); continuously changing versions of services; various runtime environments (e.g., VM, container); fast changing topology; the same operation type (e.g., stop) needs to be implemented differently for each microservice, or infrastructure element and requires specific knowledge; scalability issues for the managing system; requirement to have the same look and feel/UI/application for managing all applications/services within a datacenter/enterprise; and from a technical/architectural/organizational perspective, it is difficult to implement all operations within one application.

In view of this, implementations of the present disclosure provide a model-based service registry for software systems.

As described in further detail herein, the service registry of the present disclosure is based on a strong, semantic domain meta-model. In some implementations, services are registered at a model entity instance, which provide a service of a semantically specified meaning for the respective entity. In some examples, a service can be composed of one or more operations. In some examples, atomic operations (e.g., stop database, start application instance) are each provided as a single (micro) service. In some implementations, composed services can be provided as a combination of two or more atomic operations. In some implementations, atomic services, and composed services can also be registered at a model entity instance. As described herein, by applying the service approach on an operations granularity, the gap between the characteristics of microservice applications and traditional operation management is closed.

As described herein, implementations of the present disclosure provide multiple advantages. For example, implementations of the present disclosure support diverse applications, support dependencies between artefacts on both the application, and the infrastructure level, dynamically react to changing environments, and are independent of the artefacts' runtime environments. Implementations of the present disclosure also provide an abstraction for central, technical, and implementation independent views for operators (e.g., an operator is interested in the operation only), and is scalable/elastic. Implementations of the present disclosure further enable organizations to distribute implementation of complex all-embracing operations following (micro)service-oriented devops models.

Implementations of the present disclosure are described in further detail herein with reference to an example software system. The example software system includes landscape management. In some examples, landscape management enables central management of multiple software systems running in physical, virtual, and/or cloud infrastructures. It is contemplated, however, that implementations of the present disclosure can be realized with any appropriate software system. For example, implementations of the present disclosure can be realized in direct infrastructure related API calls to infrastructure-as-a-service (IaaS) providers, and/or the direct execution of operating system commands (e.g., shutdown).

Further, implementations of the present disclosure are described herein with reference to the terms service, and operation. In some examples, and as introduced above, a service (e.g., a micro-service) can be made up of one or more operations. In some examples, the terms service and operation are used interchangeably.

Figure 1:
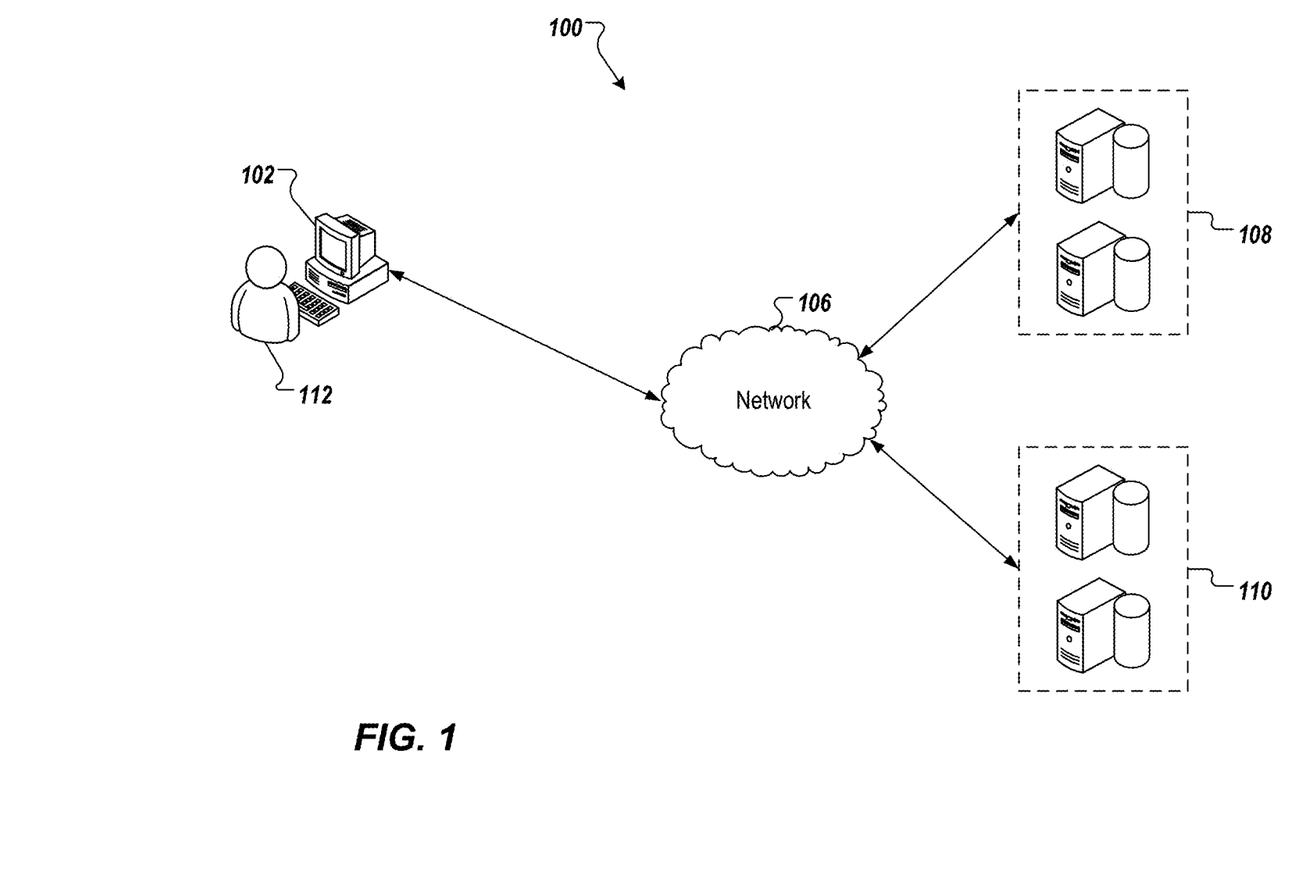
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and server systems 108. Each server system 108, 110 includes one or more server devices and databases (e.g., processors, memory). In the depicted example, a user 112 interacts with the client device 102. In an example context, the user 112 can include a user (e.g., enterprise operators, maintenance agents), who interacts with a landscape management system hosted by the server system 108. In some examples, the server system 110 hosts a model-based service registry in accordance with implementations of the present disclosure.

In some examples, the client device 102 can communicate with one or both of the server systems 108, 110 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 108, 110 includes at least one server and at least one data store. In the example of FIG. 1, the server systems 108, 110 are intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

As introduced above, implementations of the present disclosure provide a model-based service registry. As described in further detail herein, implementations of the present disclosure leverage an operations concept. In some examples, operations can be described as tightly coupled with a landscape service, and a representation of a physical landscape (e.g., having entities such as servers, databases, OSs, VMs). In some examples, the landscape service presents these entities, and their data and operations. The landscape service, however, is not responsible for executing the operations, or identifying which operations can be applied on an entity. Instead, the landscape service provides information about entities including their current state, transitions of entities, changes or entities currently created or planned to be created in future.

In some implementations, an operation is computer-executable code that can be executed to modify the physical landscape. In some examples, an operation can be implemented in a separate (micro) service, legacy software, or as part of an operation service. In some examples, an operation can reuse other operations, and orchestrate the operations to provide higher-value operations. However, every operation is managed and made available within the operation service.

In some implementations, and as described in further detail herein, the operation service (also referred to herein as operations provider) scans a landscape model of the landscape service. In some examples, scanning can reveal one or more entities within the landscape, for which an operation is available. In some examples, the operation service registers the operation(s) within an operations model of the landscape service. In some implementations, a consumer reads the list of possible operations from the operations model, and the invocation information to trigger the operation. In some examples, the consumer works on the semantic/meta-model/ high abstraction level of the landscape. Consequently, the consumer has a technology-independent view.

Figure 2:
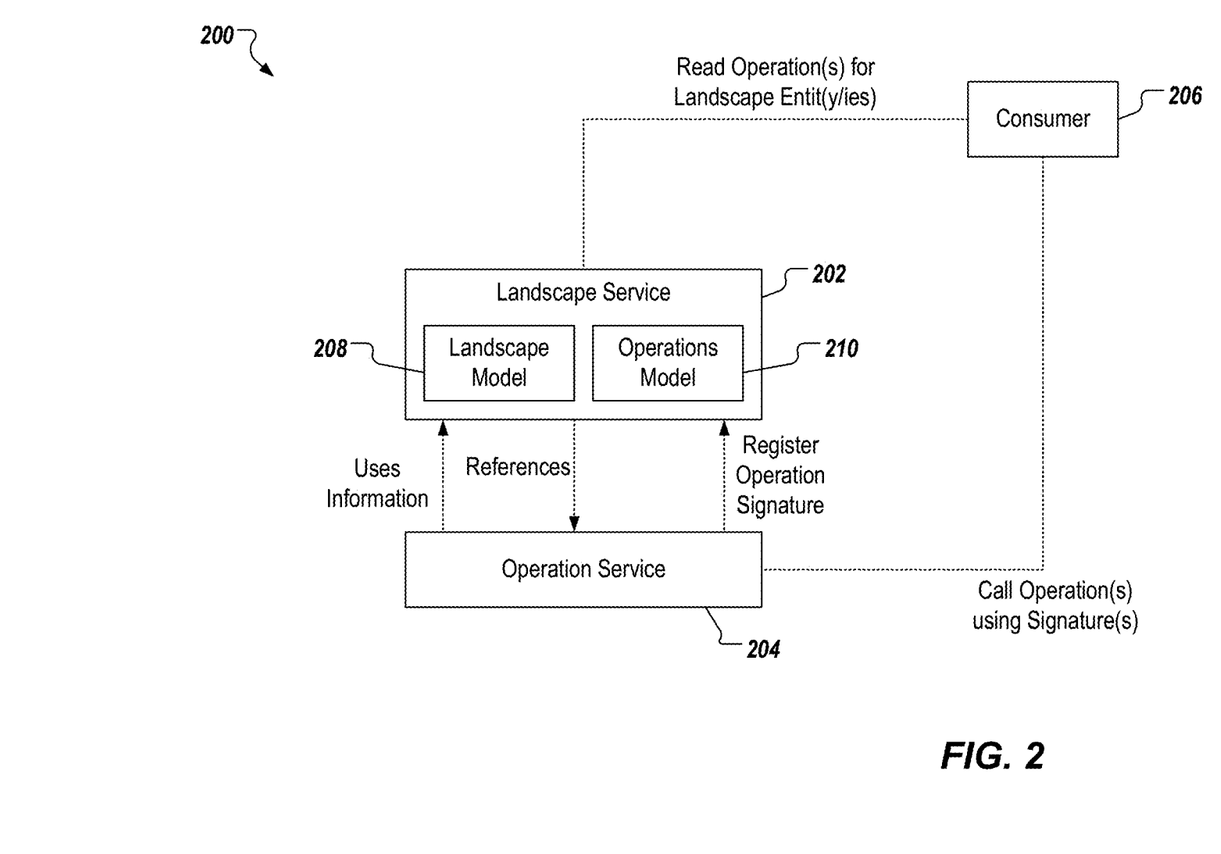
FIG. 2 depicts a conceptual architecture in accordance with implementations of the present disclosure.

FIG. 2 depicts a conceptual architecture 200 in accordance with implementations of the present disclosure. The example conceptual architecture 200 includes a landscape service 202, an operation service 204, and a consumer 206. In the depicted example, the landscape service 202 includes a landscape model 208, and an operations model 210.

In some implementations, the landscape service 202 retrieves structural data, attributes, and possible operations from the landscape (e.g., through an application programming interface (API)). In some examples, the landscape service updates the landscape model 208 based on the retrieved information, which can include static and dynamic aspects. In some examples, the landscape model 208 is a data model representing the landscape that is to be managed. For example, the landscape model 208 contains static and dynamic landscape information for managing the landscape. As described in further detail herein, the landscape model 208 can include a central, static core model (e.g., representing systems, instances, hosts, relations), and one or more supporting models providing additional landscape information.

In some examples, the landscape model 208 also contains information about current state transitions of entities, changes, and/or entities currently created or planned to be created in the future within the landscape. In some examples, the operations model 210 is a data model representing an operations (service) registry. In some examples, the operations sub-model 210 contains a list of available operations referencing entities in the landscape (e.g., entities, for which the operations can be made available).

In some implementations, the operation service 204 encapsulates service endpoint specific configuration, authentication, protocol translation, health checking, short circuiting/fail early capabilities, and additional logic. The operation service 204 acts as a proxy, and provides an interface to service operations.

In accordance with implementations of the present disclosure, the operation service 204 scans the landscape service 202 to discover any entities within the landscape that one or more operations (services) can be offered for. In some examples, if the operation provider 204 discovers an entity, for which it can offer an operation (a type of service), the operation service 204 registers the operation within the operations model 210. In some implementations, an independent operation provider implementation, and/or instance can be provided for each operation type. That is, in the example of FIG. 2, multiple operation services 204 can be provided, each operation service 204 making a respective operation (service) available to entities of the landscape. In some examples, the operation service 204 works on a fine grained/instance perspective. That is, the operation provider 204 uses detailed, technology-level information for the execution of an operation. By way of a non-limiting example, the operation service 204 needs to know the exact version of an operating system (OS) (e.g., an entity within the landscape) to stop it. In some implementations, the operation service 204 includes an internal model describing conditions that need to be fulfilled to execute respective operations. Example information can include, without limitation, structural information (e.g., topology), validations, and operations, as described in further detail herein.

In some implementations, the consumer 206 reads the list of available operations from the operations model 210, and invocation information associated with each operation. In some examples, the invocation information represents conditions to trigger the operation. In some examples, the consumer 206 works on the semantic/meta-model/high abstraction level of the landscape. In this manner, the consumer 206 has a technology independent-view. With reference to the non-limiting example above, the consumer 206 does not need to know the exact version of an OS. Instead, the consumer 206 only needs to know that the entity is an OS, and it can be stopped.

In some implementations, the landscape model interacts with one or more support models. Example support models include, without limitation, a core model, an operation model, a state model, a dynamic model, a lock model, a performance model, and one or more validations. In some examples, the one or more support models are included in the landscape model.

In some implementations, the core model is a data model that represents the artefacts of the landscape. Example artifacts can include, without limitation, applications, VMs, hardware, network connections, and interdependencies in between different entities. In some implementations, the operations model (e.g., the operations model 210 of FIG. 2) is the registry containing the operations that can be executed within a respective landscape, as described herein. In some examples, the state model represents the state of entities within the landscape. Example states can include, without limitation, started, stopped, and running.

In some examples, the dynamic model represents state transitions of entities within the landscape. For example, and without limitation, a state transition can express that a system transitions from running to stopped. In some examples, the dynamic model records information about the current state of an entity (e.g., referencing the state model), and a target state of the entity (e.g., transition from a first state to a second state). In some examples, the dynamic model represents a current transition, and/or a future transition. In some implementations, the dynamic model records a history of state transitions of respective entities (e.g., for auditing).

In some examples, the dynamic model operates together with the lock model, and validations to ensure that a delay in updating the core model, or the state model (e.g., by monitoring agents) will not result in incorrect activations, or executions of activities. For example, and without limitation, a stop operation might be triggered, but some time until the stop is finished, and until models are updated is required, because of the asynchronous and distributed approach. accordingly, setting a transition together with a lock enables other operations to not stop the system a second time. In some examples, a validation can be used to determine where the current state transition allows a particular operation.

In some examples, the lock model represents the status of locks, if any, on core model entities, or groups of entities. In this manner, the lock model can be used to synchronize operations accessing the same entities, or entities with references to each other. In some examples, the performance model maintains data about performance and resource management of entities within the landscape.

In some examples, a validation is a check that evaluates the landscape model (and, thus, the landscape) based on one or more defined validation goals. In some examples, a validation can provide that an operation may only be executed, if one or more of the operation-specific validations goals have the expected outcome. For example, and without limitation, a validation can include a check that ensures that the configured credentials are working (e.g., non-locked, password correct). Only if this is true, operations that rely on a logon using these credentials (e.g., stop) could be triggered, and registered to the landscape model. This is described in further detail herein.

Figure 3:
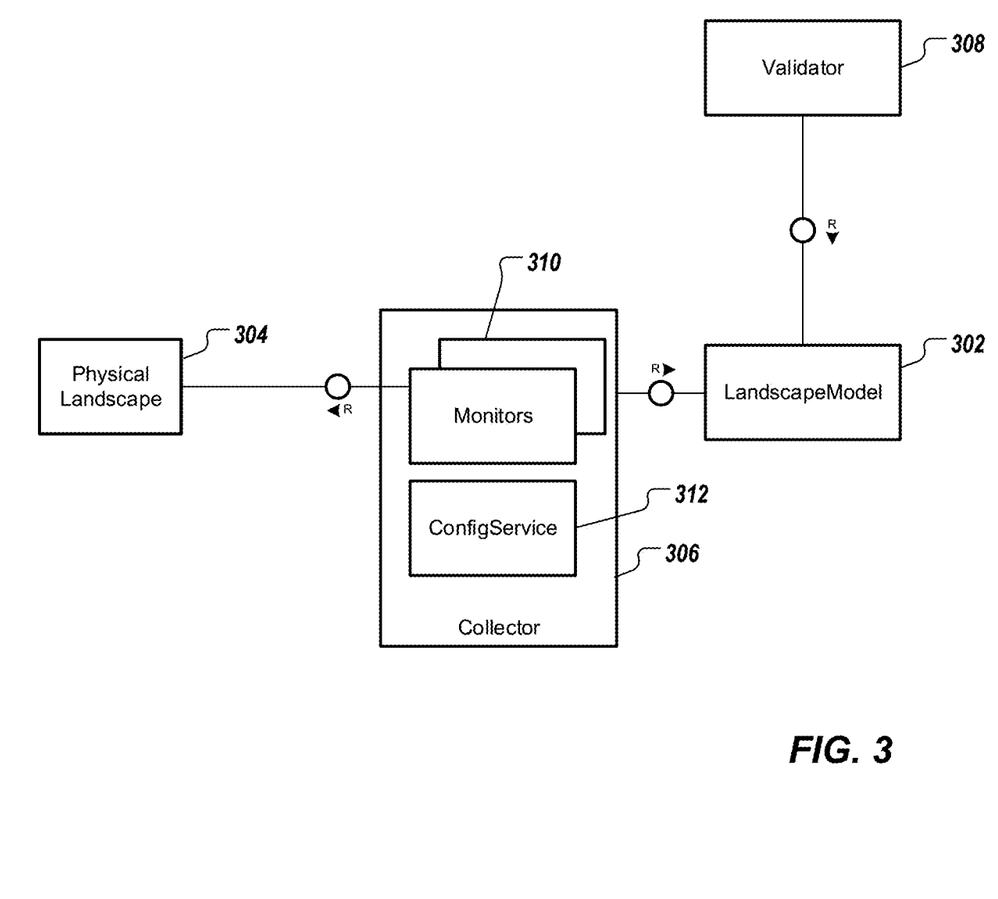
FIG. 3 depicts example updating of a model in accordance with implementations of the present disclosure.

FIG. 3 depicts example updating of a model in accordance with implementations of the present disclosure. More particularly, FIG. 3 conceptually depicts how data is updated, added, and/or deleted within a landscape model 302 (e.g., the landscape model 208 of FIG. 2). The example of FIG. 3 includes a physical landscape 304 (e.g., the landscape that is to be managed), one or more collectors 306, and one or more validators 308.

In the depicted example, the collector 306 includes one or more monitors 310, and one or more configuration services 312. In some examples, each collector 306 continuously retrieves/receives (push or poll) data from the landscape 304. In some examples, the collector 306 preprocess the data, and updates the landscape model 302 accordingly. In some examples, the actual landscape model 302 is stateless without any persistence. For example, all information of the landscape model 302 is stored in volatile memory. In some implementations, the landscape model 302 need not be stored in volatile memory, but can be directly accessed from the physical landscape when data is requested. For example, the data from the physical landscape, and additional metainformation can be added to return the information to (e.g., validations). In some examples, each validator 308 validates the landscape model 302 in response to changes, and/or periodically, as described in further detail herein.

In some implementations, the monitors 310 retrieve information from the physical landscape 304. In some implementations, the configuration services 312 have a persistence, and stored information that cannot be retrieved by monitoring. Example information can include, without limitation, organizational information about the landscape, and credentials (e.g., passwords). In some examples, the configuration services 312 send their information to the landscape model 302. For example, the information can be sent at startup, for recovery, and/or periodically to the (volatile) landscape model 302.

Figure 4:
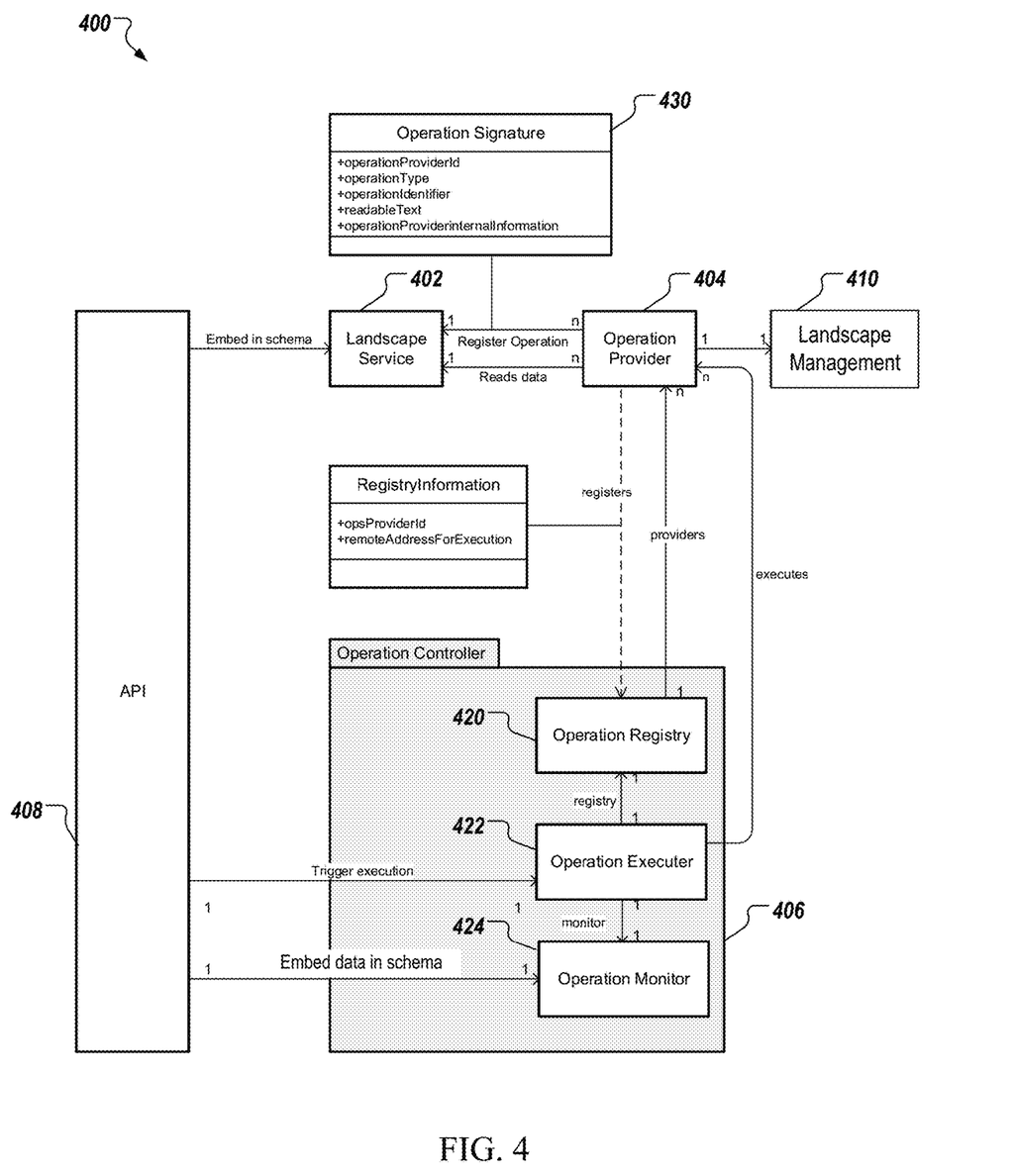
FIG. 4 depicts an example conceptual class diagram in accordance with implementations of the present disclosure.

FIG. 4 depicts an example conceptual class diagram 400 in accordance with implementations of the present disclosure. The example class diagram 400 includes a landscape service 402 (e.g., the landscape service 202 of FIG. 2), an operation provider 404 (e.g., the operation service 204 of FIG. 2), an operation controller 406, an API 408, and a software system 410 (e.g., a landscape management software system). In the depicted example, the operation controller 406 includes an operation registry 420, an operation executer 422, and an operation monitor 424.

In some implementations, and as introduced above, multiple operation providers 404 can be included (e.g., n operation providers (n≥1), where each operation provider can make m operations available (m≥1)). In some examples, the operation provider 204 is the single point-of-access to operations (e.g., by consumers). The operations provider 404 maps generic operation calls from consumers (e.g., the consumer 206 of FIG. 2) to specific calls to execute the concrete operation. Consequently, the operation provider 404 provides an abstraction layer from the consumer, and the operation.

In some implementations, operation service endpoints implement functionality targeting for a change in the landscape, and/or attributes of the landscape. In some examples, in instances of interruption, the operation provider 404 is able to reattach to the operation service endpoints. In some examples, operation provider 404 encapsulates configuration, authentication, protocol translation, health checking, and/or short circuiting/fail early capabilities that are specific to the endpoints. In some implementations, the operation provider 404 provides multiple operations. For each operation, the operation provider 404 is responsible for measures that retrieve the required data, and adding operation-specific logic, if required. In some examples, an operation executed by the operation provider can rely on the result, and/or availability of other operations. In some examples, and as described in further detail herein, the operation provider 404 can internally manage multiple instances for each operation provided through its interface, and/or for each registered operation signature 430.

In some implementations, the operation provider 404 queries the landscape service 402 to retrieve information required to execute the operation(s) supported by the operation provider 404. In some examples, the operation provider 404 registers operations to entities of the landscape within the landscape service 402. That is, for each entity of the landscape, for which an operation can be applied, and the operation type is allowed, the operation provider 404 registers a respective operation signature 430. In some examples, the operation provider 404 also registers an endpoint of the entity in the operation controller 406. The endpoint can be used for call back when it comes to the concrete execution of an operation, and/or to provide status information for already running operations. Further, the operation provider 404 registers an endpoint used to start the respective validations for an operation signature 430.

The operation provider 404, and its internal operation representations encapsulate all requisite operation-specific knowledge. They are also responsible for triggering the correct validations, and providing a method for the validations to be triggered by one single call (e.g., from the operation controller 406).

With regard to the operation signature 430, q operation signatures can be provided (q≥0) for each entity, and available operation type for the entity. In some examples, the operation signature 430 contains information on how to trigger the respective operation by the operation provider 404. The operation signature 430 is registered to a certain operation type for a concrete entity instance within the landscape service 402. In some implementations, the operation signature 430 includes the following information: the operation provider 404 to be called, the operation type the operation provider 404 provides an operation for, an operation identifier, and a human-readable description of the operation.

In some implementations, and as introduced above, the operation provider 404 may need additional information to map its previous registration to a concrete operation, and a landscape entity the operation should be applied on. Consequently, the operation signature 430 enables custom strings to be added, and returned to the operation provider 404. This internal information can contain data needed to execute the operation. This can include data the operation provider 404 is required to check the availability of before registering an operation. In some examples, this information is associated with the operation signature 430 to avoid redundant queries for the information.

In some implementations, validations are a list of operations that must return a value as defined by the operation provider 404 to ensure a to-be-executed operation will succeed. There are multiple situations for calling validations. For example, a validation can be called, if a function is to be enabled in a UI/be executable. This is motivated by a feasible UI, but with lower requirements on correctness. As another example, a validation can be called before executing the actual operation. This is motivated by the need for a consistent and correct execution, but with lower requirements on response time.

In some implementations, and as described herein, the landscape service 402 contains an internal operation model, and provides access to this information in conjunction with the actual entities of the landscape. In some examples, the operation model contains schematic information about valid operation types for an entity type. Operation signatures 430 provided by operation providers 404 are attached/associated with these possible operation types on a per entity basis. In some examples, the operations are directly associated to the entities, without the definition of an operation type. The landscape service 402 makes this information available for the concrete entities the operation is associated with and all super-types the entity specializes for, and the operation type is defined for. In some examples, the landscape service 402 makes the operations available through the API 408.

As a note, the landscape model has an understanding of entity types in the real-world (e.g., system type extends system extends software). For each entity type, a definition of allowed operation types can be provided (e.g., StopOpType). The actual operations are registered for a concrete instance of a system within the landscape. This can be achieved by using a triplet (e.g., <SAPSystemId>, StopOpType, OperationSignature), or tuple in case the type is part of the signature (e.g., <SAPSystemId>, OperationSignature). Consequently, it is possible to call a stop operation for each software exactly the same way, for example, although the actual system and operation are different.

In some implementations, the operation controller 406 receives requests from the API 408 to trigger an operation against an entity by receiving the respective operation signature 430. In some examples, the operation controller 406 first triggers a validation of the operation. If all validations are valid, the operation controller 406 executes the actual operation call. In some examples, validations can be triggered independently for UI checks.

With regard to execution of the operation, the operation executer 422 uses the operation registry 420 to receive the endpoint for the respective operation provider 404. The operation executor 422 forwards the operation signature 430 to the operation provider 404, and notifies the operation monitor 424 about triggering the operation. The operation monitor 424 continuously reads the operation status from the operation provider 404, and persist the information for auditing compliance together with the respective User ID.

In some implementations, the operation registry 420 resolves operation signatures to respective operation providers 404. That is, the operation registry 420 identifies a respective operation provider 404 based on the operation signature 430. In some examples, the operation registry 420 calls the landscape service 402 to remove all operation signatures 430 provided by a particular operation provider 404, if the operation provider 404 is offline for a threshold period.

In some implementations, validation is provided as special operation type (e.g., VALIDATION). In some examples, validations are provided by validation providers. In some implementations, the operation provider and validation providers can be deployed within the same instance/service. However, validation can be reused by other operations. In some examples, the same validations may work on either cached data, or new loaded data from the landscape, dependent on their execution context.

Figure 5:
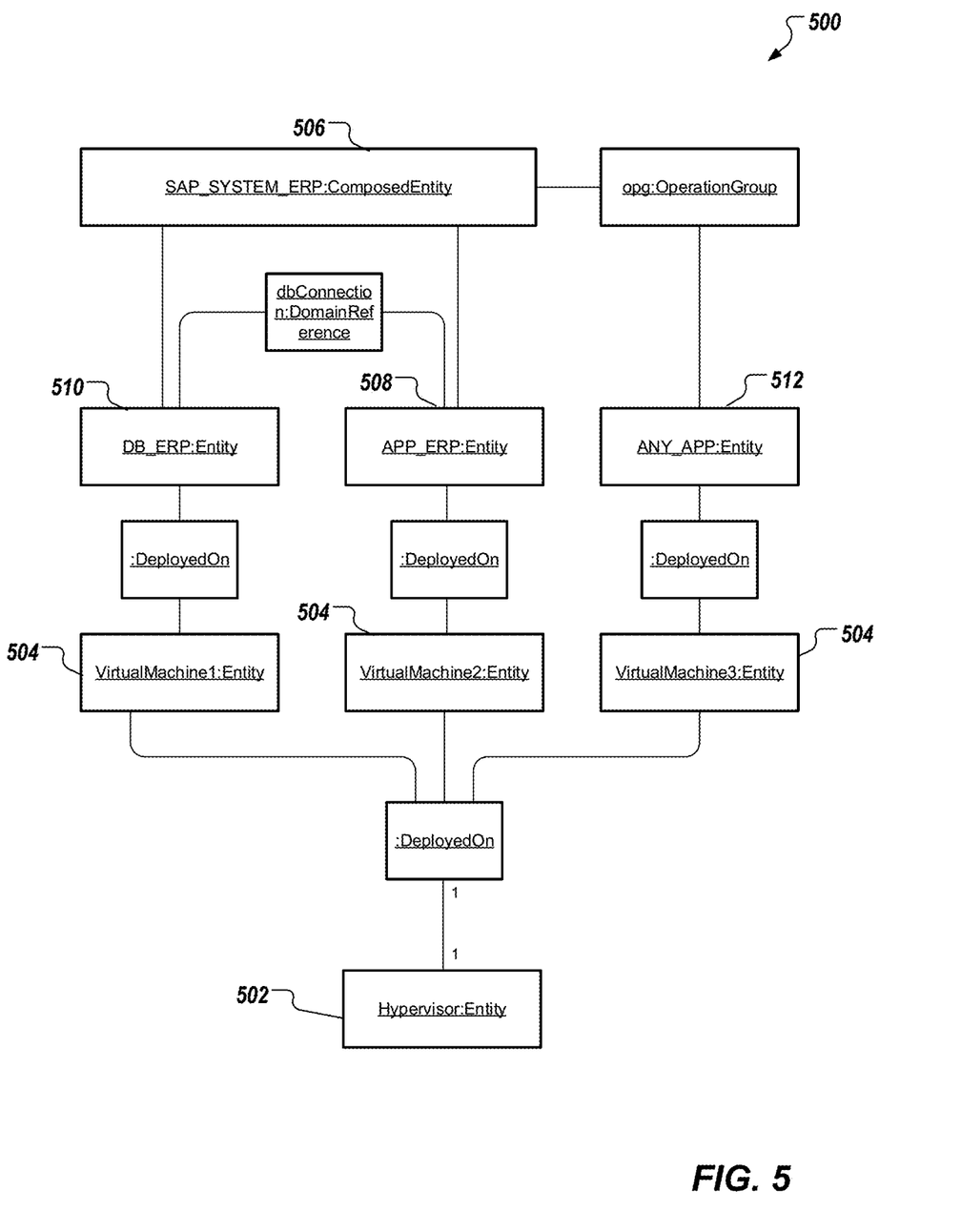
FIG. 5 depicts an example instance in accordance with implementations of the present disclosure.

FIG. 5 depicts an example instance 500 in accordance with implementations of the present disclosure. The example instance 500 is of a landscape model including one hypervisor (HV) 502 with three VMs 504. The HV 502 can be described as a VM monitor (VMM) that creates and runs the VMs 504. The example instance 500 includes one enterprise resource planning (ERP) system 506 including an application 508, and a database (DB) 510 (e.g., provided by SAP SE of Walldorf, Germany). The ERP system 506 is installed distributed on two VMs 504, and another application 512 is installed on the third VM 504.

Tables 1 and 2, below, represent validations, and operations, respectively, that have been registered by one or more operation providers, and validators:

TABLE 1

Example Entity Validations

| Entity | Validation n | Validation n + 1 |
|---|---|---|
| DB_ERP | consistent = true | storageOnFiler = true |
| APP_ERP | dbConnected = true | storageOnFiler = true |
| VM1 | error = false | stopEnabled = true |
| VM2 | error = false | stopEnabled = true |
| VM3 | error = false | stopEnabled = true |
| Hypervisor | managed = true | deleteEntitiesEnabled = true |
| dbConnection | networkConfig = true | deleteEnabled = true |
| SAP_SYSTEM_ERP | error = false | |

TABLE 2

Example Operations

| OpInst | Instance | Validations | Top'y/State | preceding Operations |
|---|---|---|---|---|
| stopDB | DB_ERP | consistent = true | db = running | |
| stopApp | APP_ERP | dbConnd = true | app = running | |
| stopSys | SAP_SYS_ERP | error = false | . . . | stopApp stopDB |
| unprepRunSys | SAP_SYS_ERP | HV[managed] = true VM_n[error] = false DB[storOnFiler] = true APP[storOnFiler] = true | . . . | stopSys stopVM1, stopVM2, stopVM3 delVM1, delVM2, delVM3 removeNetworkConfig |
| stopVM1, stopVM2, stopVM3 | VM1-3 | . . . | . . . | |
| delVM1, delVM2, delVM3 | VM1-3 | . . . | . . . | |
| remNetConfig | dbConn | netConfig = true | . . . | |
| stopAnyApp | ANY_APP | . . . | . . . | |
| stopAllInOpg | Opg | . . . | . . . | stopSystem stopAnyApp |

For ease of reading, a column describing the operation type has been omitted in Table 2. However, the operationsInstance (opInst) name is relatively self-explanatory. Unprepared is an operation that removes the instance of a system from any executable environment, but keeps the data persisted. Thus, the system might be recovered/prepared in a later point in time. The operations stopVM* and delVM* are independent and have been added into one column for the sake of readability. In the validations column, VM_n, DB, and APP refer to VirtualMachine*, DB_ERP, APP_ERP, respectively. The ellipses ( . . . ) express that there are potential entries, but omitted for the sake of readability.

In some examples, the example instance 500 can be modelled in a landscape model of a landscape service. For example, as VMs 504 are spun-up/spun-down, the landscape model can be updated to reflect the current, and/or future state of the landscape. In some examples, and as described herein, an operation provider scans the landscape model of the landscape service to reveal one or more entities within the landscape, for which an operation is available. In the example of FIG. 5, and as depicted in the tables, entities can include DB_ERP, APP_ERP, VM1, VM2, VM3, Hypervisor, dbConnection, and SAP_SYSTEM_ERP.

One or more validations can be provided for each entity, and each operation. Example validations are depicted in Table 1. For example, to execute the operation stopDB on the entity DB_ERP, a validation requires that the database consistency be equal to true. As another example, to execute the operation stopAPP on the entity APP_ERP, a validation requires that the database be connected (e.g., dbConnd=true).

Figure 6:
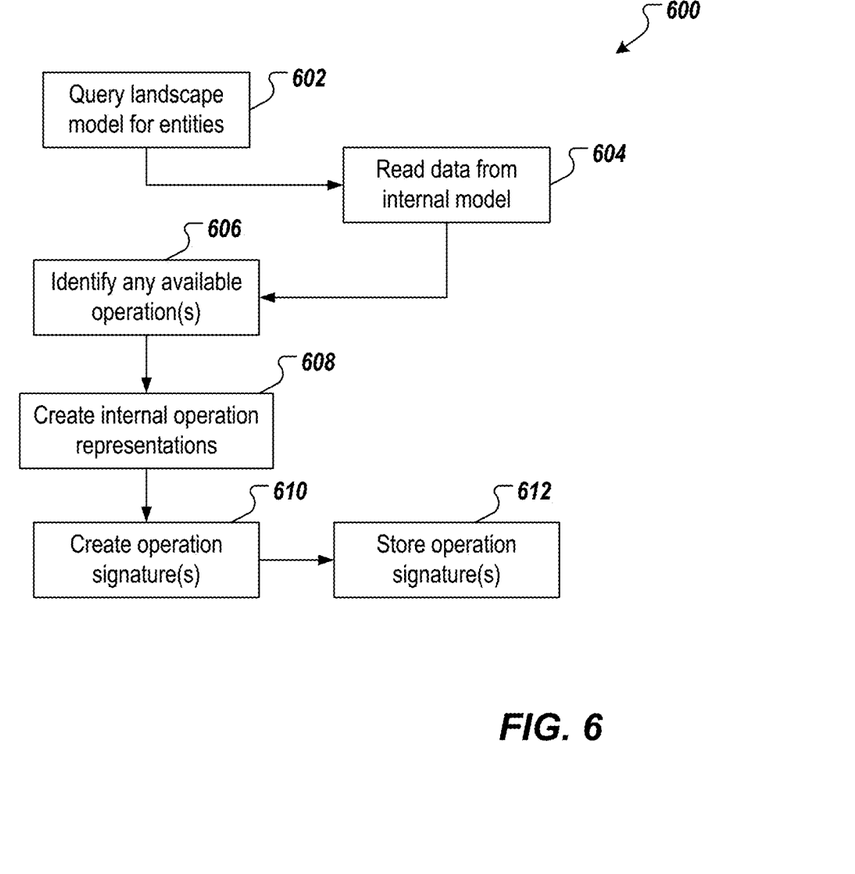
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices. The example process 600 of FIG. 6 can be executed to register an operation from an operation provider on the landscape service. In some examples, and as described herein, the operation provider regularly (e.g., periodically, every r seconds) registers at the operation controller. In this manner, no method is required to restore from a failure state, where the operation controller had to restart or retrieve all data again. As described herein, the operation provider is registered with the operation controller, which includes the operation provider in a register of operation providers.

A landscape model is queried for entities (602). For example, and as described herein, an operation provider queries the landscape model of a landscape service to scan entities, for which the operation provider may have one or more operations available. Data is read from an internal model (604). For example, in response to the query, the landscape service reads data from the landscape model to provide a list of entities. Any available operations are identified (606). For example, based on a query result provided from the landscape service, the operation provider identifies one or more operations that are available for entities of the landscape.

One or more internal operation representations are created (608), and one or more operation signatures are created (610). For example, for each operation that is available for an entity of the landscape, the operation provider provides a respective operation signature, which can be used to call the operation, as described in further detail herein. The one or more operation signatures are stored (612). For example, the landscape service stores the operation signature(s) (e.g., in the operation model).

Figure 7:
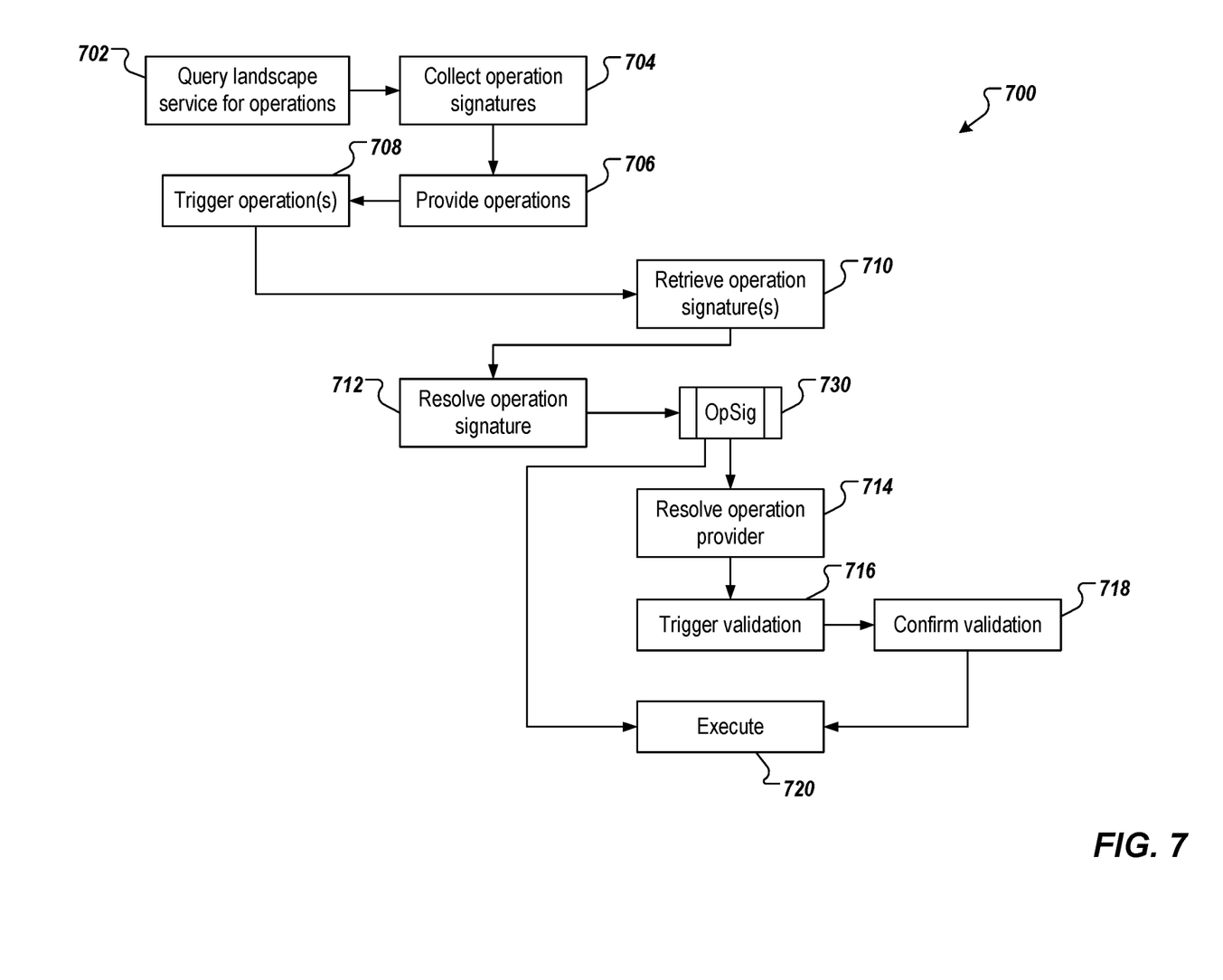
FIG. 7 is a schematic illustration of example computer systems that can be used to execute implementations of the present disclosure.

FIG. 7 depicts an example process 700 that can be executed in accordance with implementations of the present disclosure. In some examples, the example process 700 is provided using one or more computer-executable programs executed by one or more computing devices. The example process 700 of FIG. 7 depicts an operation execution when triggered by a consumer. In some examples, the call from the operation controller to the operation provider is asynchronous, and returns an identifier that is used to monitor the executed operation.

The landscape service is queried for operations (702). For example, a consumer queries the landscape service for one or more operations that may be available. A set of operation signatures is collected (704), and corresponding operations and signatures are provided (706). For example, the landscape service provides the operations and operation signatures to the consumer that submitted the query. One or more operations are triggered (708). For example, the consumer triggers an operation based on a respective operation signature.

Operation signatures are retrieved (710). For example, the operation controller receives a call through the API to trigger an operation. The operation signature is resolved (712). For example, based on the data provided in the received call, the operation controller determines the corresponding operation signature 730. The operation provider is resolved (714). For example, and based on the operation signature 730, the operation controller identifies the operation provider for execution of the called operation. Validation is triggered (716). For example, the operation controller triggers the operation provider to check any validations required to be true for the particular operation to be executed. Validation is confirmed (718). For example, the operation provider determines whether each of the validations is true. In some examples, if the validation is false (e.g., one or more validation conditions are not met), an error is returned, and the operation is not executed. In some examples, if the validation is true (e.g., all validators are met), the operation is executed (720) For example, the operation is executed at the identified endpoint, and the operation controller monitors operation execution, as described herein.

Figure 8:
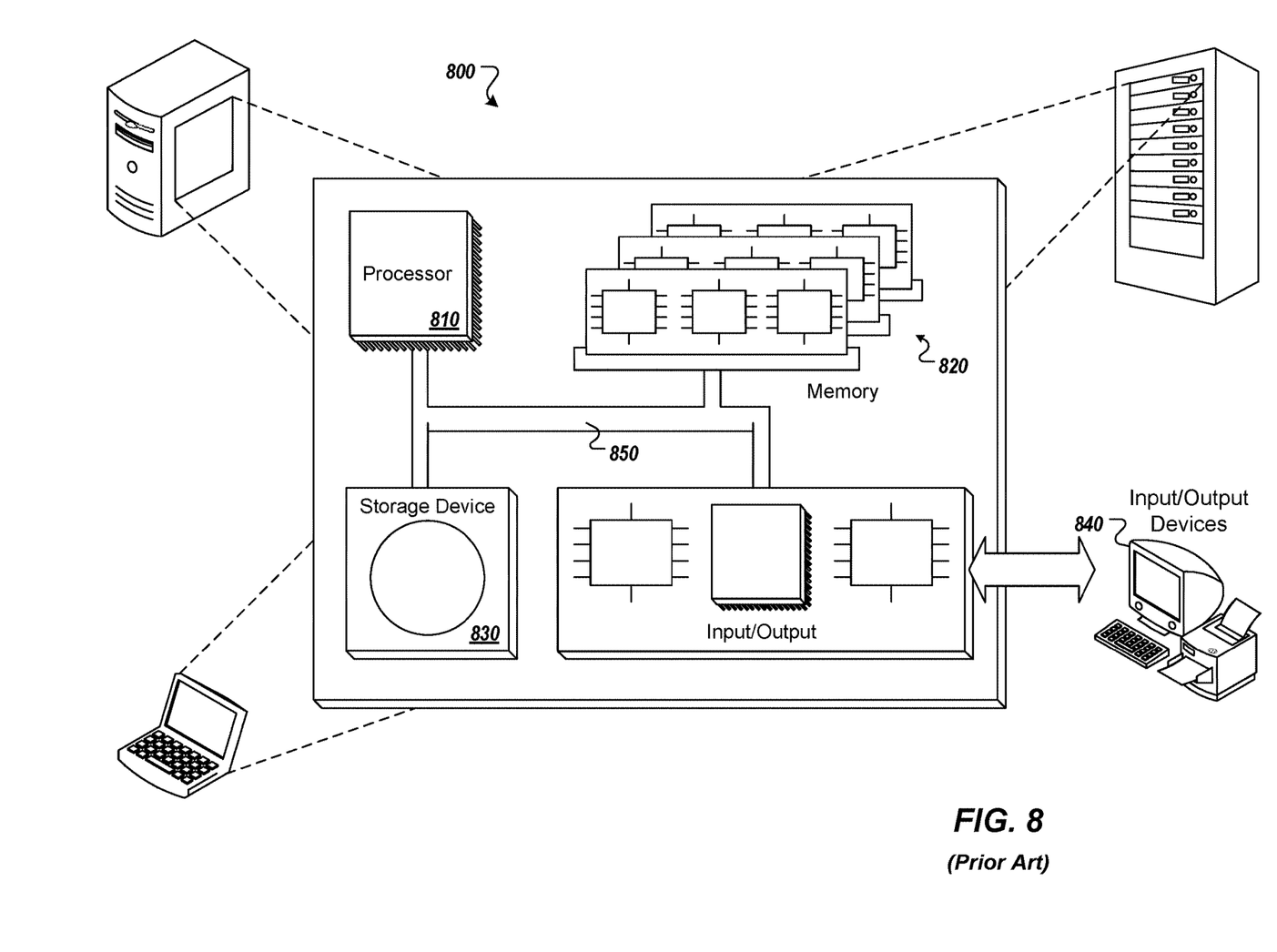
FIG. 8 is a schematic diagram of an example computing system 800.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a model-based service registry for software systems, the method being executed by one or more processors and comprising:
   receiving, by an operation controller, a call to trigger an operation to be executed for an entity within a landscape of multiple entities, the call at least partially comprising an identifier associated with an operation signature, the operation comprising computer-executable instructions executable to perform at least a portion of a service for entities of the landscape;
   providing the operation signature based on the identifier, the operation signature comprising information indicating an operation provider to be called for execution of the operation, an operation type, and an operation identifier;
   identifying, by the operation controller and based on the information of the operation signature, the operation provider that provides the operation, the operation provider being registered with in an operations registry within the operation controller by the operation provider, the registering comprising:
      scanning the landscape based on a landscape model that is maintained by a landscape service that is separate from the operation controller, and
      identifying, based on the scanning, one or more entities within the landscape, for which the operation provider can execute the operation, and in response, registering the operation in the operation registry;
   validating, by the operation provider, one or more conditions for execution of the operation; and
   executing, by the operation provider, the operation to affect the entity within a landscape in response to the one or more conditions being valid.

2. The method of claim 1, wherein scanning at least partially comprises:
   receiving, by the landscape service and from the operations provider, a query for one or more operations that can be executed to affect the entity within the landscape; and
   providing, by the landscape service, and in response to the query, a set of operations available for the entity based on the landscape model, the landscape model comprising a data model representative of the landscape, the set of operations comprising at least the operation.

3. The method of claim 2, wherein the landscape service further comprises an operations model representing the operations registry comprising operations available for entities of the landscape.

4. The method of claim 1, wherein the one or more conditions are based on one or more validations that define a state of one or more entities of the landscape for execution of the operation.

5. The method of claim 1, wherein the operation provider is included in a plurality of operation providers registered with the operation controller.

6. The method of claim 1, wherein the operation controller monitors execution of the operation.

7. A non-transitory computer-readable storage medium coupled to one or more processors and having instructions stored thereon which, when executed by the one or more processors, cause the one or more processors to perform operations for providing a model-based service registry for software systems, the operations comprising:
   receiving, by an operation controller, a call to trigger an operation to be executed for an entity within a landscape of multiple entities, the call at least partially comprising an identifier associated with an operation signature, the operation comprising computer-executable instructions executable to perform at least a portion of a service for entities of the landscape;
   providing the operation signature based on the identifier, the operation signature comprising information indicating an operation provider to be called for execution of the operation, an operation type, and an operation identifier;
   identifying, by the operation controller and based on the information of the operation signature, the operation provider that provides the operation, the operation provider being registered with in an operations registry within the operation controller by the operation provider, the registering comprising:
      scanning the landscape based on a landscape model that is maintained by a landscape service that is separate from the operation controller, and
      identifying, based on the scanning, one or more entities within the landscape, for which the operation provider can execute the operation, and in response, registering the operation in the operation registry;
   validating, by the operation provider, one or more conditions for execution of operation; and
   executing, by the operation provider, the operation to affect the entity within a landscape in response to the one or more conditions being valid.

8. The computer-readable storage medium of claim 7, wherein scanning at least partially comprises:

receiving, by the landscape service, a query for one or more operations that can be executed to affect the entity within the landscape; and providing, by the landscape service, and in response to the query, a set of operations available for the entity based on the landscape model, the landscape model comprising a data model representative of the landscape, the set of operations comprising at least the operation.

9. The computer-readable storage medium of claim 8, wherein the landscape service further comprises an operations model representing the operations registry comprising operations available for entities of the landscape.

10. The computer-readable storage medium of claim 7, wherein the one or more conditions are based on one or more validations that define a state of one or more entities of the landscape for execution of the operation.

11. The computer-readable storage medium of claim 7, wherein the operation provider is included in a plurality of operation providers registered with the operation controller.

12. The computer-readable storage medium of claim 7, wherein the operation controller monitors execution of the operation.

13. A system, comprising:
a computing device; and
a computer-readable storage device coupled to the computing device and having instructions stored thereon which, when executed by the computing device, cause the computing device to perform operations for providing a model-based service registry for software systems, the operations comprising:
receiving, by an operation controller, a call to trigger an operation to be executed for an entity within a landscape of multiple entities, the call at least partially comprising an identifier associated with an operation signature, the operation comprising computer-executable instructions executable to perform at least a portion of a service for entities of the landscape;
providing the operation signature based on the identifier, the operation signature comprising information indicating an operation provider to be called for execution of the operation, an operation type, and an operation identifier;
identifying, by the operation controller and based on the information of the operation signature, the operation provider that provides the operation, the operation provider being registered with in an operations registry within the operation controller by the operation provider, the registering comprising:
scanning the landscape based on a landscape model that is maintained by a landscape service that is separate from the operation controller, and
identifying, based on the scanning, one or more entities within the landscape, for which the operation provider can execute the operation, and in response, registering the operation in the operation registry;
validating, by the operation provider, one or more conditions for execution of the operation; and
executing, by the operation provider, the operation to affect the entity within a landscape in response to the one or more conditions being valid.

14. The system of claim 13, wherein scanning at least partially comprises:
receiving, by the landscape service, a query for one or more operations that can be executed to affect the entity within the landscape; and
providing, by the landscape service, and in response to the query, a set of operations available for the entity based on the landscape model, the landscape model comprising a data model representative of the landscape, the set of operations comprising at least the operation.

15. The system of claim 14, wherein the landscape service further comprises an operations model representing the operations registry comprising operations available for entities of the landscape.

16. The system of claim 13, wherein the one or more conditions are based on one or more validations that define a state of one or more entities of the landscape for execution of the operation.

17. The system of claim 13, wherein the operation provider is included in a plurality of operation providers registered with the operation controller.

* * * * *